United States Patent [19]
Takahashi et al.

[11] 3,876,453
[45] Apr. 8, 1975

[54] METHOD FOR PAINTING ALUMINIUM OR ALUMINIUM-BASED ALLOY MATERIAL

[75] Inventors: Toshiro Takahashi; Toshihiro Nagano, both of Shizuoka; Matsuo Suzuki, Yaizu; Shozo Suzuki; Yasuo Aoshima, both of Shizuoka; Teruo Asahina, Fujieda; Katsushige Ikeda, Ibaragi; Isao Hayashi, Hirakata; Takashi Kato, Moriguchi; Nobuo Minagawa, Ashiya, all of Japan

[73] Assignees: Riken Light Metal Industries Co., Ltd., Shizuoka; Kuboko-Paint Co., Ltd., Osaka, both of, Japan

[22] Filed: Dec. 20, 1972

[21] Appl. No.: 316,718

[30] Foreign Application Priority Data

| Dec. 25, 1971 | Japan | 46-1785 |
| Dec. 25, 1971 | Japan | 46-1786 |
| Dec. 25, 1971 | Japan | 46-1787 |
| Dec. 25, 1971 | Japan | 46-1788 |
| Dec. 25, 1971 | Japan | 46-1789 |
| Mar. 29, 1972 | Japan | 47-31305 |
| July 5, 1972 | Japan | 47-66612 |
| July 5, 1972 | Japan | 46-66613 |
| Sept. 28, 1972 | Japan | 47-96643 |
| July 14, 1972 | Japan | 47-70632 |

[52] U.S. Cl. ............... 117/62; 423/627; 423/631; 51/320; 51/321
[51] Int. Cl. ............................................. B44d 1/44
[58] Field of Search .......... 117/62, 119.6; 423/627, 423/631; 51/319, 320, 321; 148/6.1

[56] References Cited
UNITED STATES PATENTS

| 2,600,358 | 6/1952 | Bolton et al. | 51/320 |
| 2,817,195 | 12/1957 | Curtin | 51/321 |
| 2,958,581 | 11/1960 | Herbert et al. | 423/627 |
| 2,958,583 | 11/1960 | Hervert et al. | 423/627 |
| 3,058,855 | 10/1962 | Kirby et al. | 117/62 X |
| 3,188,174 | 6/1965 | Kehl et al. | 423/631 |
| 3,420,692 | 1/1969 | Jeff et al. | 117/119.6 X |
| 3,423,251 | 1/1969 | Metcalfe et al. | 117/62 X |
| 3,427,763 | 2/1969 | Maasberg et al. | 51/321 |
| 3,515,598 | 6/1970 | Scheokol | 117/62 X |
| 3,559,351 | 2/1971 | Richter | 51/321 X |

*Primary Examiner*—Roland E. Martin, Jr.

[57] ABSTRACT

A strong base layer for painting on an aluminous material, a thermosetting resin paint and a painted film having high cohesion and corrosion resistance are produced by forming a boehmite layer in various processes on the aluminous material and immersing the aluminous material provided with the boehmite layer in a water soluble thermosetting resin paint at 40°–60°C containing an organic amine and removing the aluminous material from the paint bath and heating the paint thus deposited on the aluminous material to bake and cure the paint.

9 Claims, No Drawings

METHOD FOR PAINTING ALUMINIUM OR ALUMINIUM-BASED ALLOY MATERIAL

The present invention relates to a method for painting an aluminum or aluminum-based alloy material and particularly to a method for forming a resin coated film having high cohesion on an aluminum or aluminum-based alloy material by treating said material in the presence of water at an elevated temperature at the same time as or after a pre-treatment while forming rapidly a boehmite layer which is a strong base layer suitable for painting.

In the specification, an aluminum or aluminum-based alloy material is referred to as merely "an aluminous material."

Heretofore, aluminous materials have been used for buildings, ships, airplanes and the like, for they have specific properties. The aluminous materials are subjected to an anodic oxidation in an electrolytic bath, such as a sulfuric acid bath to form a porous oxide film and then the pores in the resulting porous oxide film are sealed by a treatment with boiling water or a pressured steam. However, in alumite film formed by the anodic oxidation, the pores are not sealed completely by the above described treatment and some pores remain without sealing and from such portions corrosion can take place in the aluminum substrate.

In addition, it has been proposed to form a chemical film by immersing an aluminous material in a mixed solution of sodium carbonic anhydride and sodium chromic anhydride but the hardness of the formed film itself is low and has a low corrosion resistance.

It has been contemplated to protect the surface of the aluminous material by forming the above described base layer on the aluminous material by anodic oxidation for maintaining a beautiful appearance and then coating a paint thereon by a spray painting, an immersing painting, an electrostatic painting and the like.

However, it is not economical nor efficient to use a film formed for protecting an aluminous material as a base layer for painting and such a film has drawbacks in view of the fact that cohesion of the painted film and the strength of the formed composite coated film is not always satisfactory.

The present invention seeks to solve these problems and an object of the present invention is to provide a process for forming a coated film on an aluminous material and a process for forming a base layer for painting which is optimum for obtaining such coated film.

The inventors have sought a process having as many factors as possible which are common for both the means for forming a base layer for painting and the means for the painting treatment and as a result developed a process for painting an aluminous material by combining a means for forming a boehmite layer on an aluminous material and a process wherein the aluminous material provided with the boehmite layer is immersed in a water soluble thermosetting resin paint and then the paint is baked and cured to form a painted film.

It has been previously known that a boehmite film is formed on an aluminous material by immersing the aluminous material in water at a temperature higher than 75°C after degreasing and washing with water. Furthermore, water at higher than 75°C containing an organic amine or ammonium promotes the formation of the boehmite layer.

The inventors have found that an aluminous material can be most simply painted by immersing the aluminous material in a water-soluble thermosetting resin paint for a short time and then baking and curing the resin. For the production of the water-soluble resin to be used for the purpose, the resin polymer must have an added organic amine and the addition of the organic amine aims at the adjustment of the pH for use as a paint.

Furthermore, the inventors have found that when an aluminous material is immersed in the above described paint heated at a temperature higher than 40°C, the paint is not only coated on the aluminous material, but also a boehmite or bayerite layer is formed on the aluminous material and that since the paint is heated, a solvent in the paint depositing on the surface of the aluminous material is evaporated rapidly upon taking up the painted aluminous material to form a thick coated film.

From these facts, it has been concluded that between the process for forming a boehmite layer on an aluminous material as a base layer for painting and the process for forming a coated film by immersing the aluminous material in the water-soluble thermosetting resin paint and then baking and curing the paint, there are the following common factors.

1. Presence of water.
2. Treatment under heated condition.
3. Presence of amine in each treatment.

Accordingly, the inventors have found a process for painting in which these common factors are most reasonably combined, that is a process for painting an aluminous material wherein a degreased and washed aluminous material is immersed in the heated water soluble thermosetting resin paint containing an organic amine to deposit the paint on the aluminous material and simultaneously to form a base layer for painting and then the deposited paint is baked and cured.

However, the formation of a stable boehmite layer necessary for the base layer for painting requires a temperature higher than 75°C in water or an aqueous solution and therefore, in the above described process, the paint itself must be heated to a temperature higher than 75°C and at such a high temperature the deterioration of the paint is conspicuous. However, at a temperature lower than 75°C, only a bayerite layer is formed and therefore sufficient ability of the base layer for painting can hardly be attained.

Moreover, in order to form a desired base layer for painting only in the paint bath, the immersing time needs about 30 minutes and a large number of paint baths must be provided in order to conform to a cycle time (5–10 minutes) of the other treating steps and it has been found that this process is not advantageous commercially.

In addition, it has been found that boehmite is a hydrate of aluminum oxide but the color of boehmite is influenced by impurities in the aqueous solution upon the formation of boehmite and when it is intended to obtain a clear painting of an aluminous material by this process, it is difficult to obtain a colorless clear boehmite layer necessary for such a painting.

The inventors have solved the problem that the base layer for painting and the coated film are formed separately without supplementing and completing each property mutually both in the formation step and the quality, which is the common drawback in conventional process, obviated the drawbacks in the above described idea and developed this idea whereby the present invention has been accomplished.

The present invention seeks at to solve the following general problems in conventional processes.

1. Both the base layer formed by an anodic oxidation and the boehmite base layer formed in a heated aqueous solution are easily soluble and are not suitable as the base layer for painting.

Namely, the film formed by an anodic oxidation is rapidly dissolved in a boiled disengaging solution (for example, an aqueous solution of $CrO_3$ and phosphoric acid).

The above described boehmite layer is also easily soluble and dissolved in the boiled disengaging solution for about 20 minutes and a difficultly soluble boehmite layer is not substantially obtained.

2. Even if a boehmite layer is formed as a base layer, impurities are admixed and bonded upon the formation boehmite layer to color the boehmite layer and it is difficult to obtain a clear boehmite layer commercially and therefore it is impossible to utilize the inherent color of aluminous materials effectively.

3. Both the layer formed by an anodic oxidation and the above described chemically formed layer are low in mechanical strength and therefore when the aluminous material is deformed, these layers are frequently broken and further these layers are poor in cohesion with the painted film.

4. Since the painting of an aluminous material is effected at room temperature, it is difficult to form a thick coated film.

The first aspect of the present invention consists in a process for painting of an aluminous material in which the aluminous material is firstly heated in the presence of water and an agent for promoting formation of a boehmite layer, such as an organic amine or nitric acid to form a boehmite layer and successively the thus treated aluminous material provided with the boehmite layer is immersed in a water soluble thermosetting resin paint containing an organic amine heated at a temperature of about 40°–60°C to deposit the paint on the aluminous material and then it is taken out from the paint bath and the deposited paint is set and then baked and cured under such a condition that the paint deposited on the surface of the aluminous material contains water and organic amine.

An embodiment for forming the boehmite layer will be explained hereinafter.

An aluminous material is pretreated as in a conventional manner, that is said material is degreased and washed with water and is subjected to an etching, washed with water, neutralized and washed with water.

The thus treated aluminous material is immersed in warm water or a warm aqueous solution containing an organic amine. This immersing step aims at the formation of bayerite and to promote the formation of boehmite in the next step. Accordingly, in this embodiment the treatment in the warm water is an essential requirement and the temperature of the warm water is higher than 40°C in view of the rapid formation of boehmite in the next step whereas a temperature higher than 75°C is not preferable in view of the formation of bayerite, because at such a temperature the formation of boehmite layer commences.

The organic amine is added in order to promote the formation of boehmite effectively.

An explanation will be made hereinafter with respect to the difference between bayerite and boehmite. Namely, both bayerite and boehmite are crystalline aluminum oxide hydrates but the amount of crystal water is different and they are different in structure (for example, bayerite is $\gamma$-$Al_2O_3 3H_2O$ and boehmite is $\gamma$-$Al_2O_3.H_2O$).

After the bayerite layer is formed on the aluminous material as described above, the aluminous material is immediately immersed in boiling water or sprayed with steam to form a boehmite layer.

The above described embodiment has the following advantages.

1. The bayerite layer is previously formed on the aluminous material and then the boehmite layer is formed. Therefore, the formation of boehmite is more promoted than in the direct formation of boehmite.

2. When the aluminous material is subjected to the treatment for forming boehmite, for example spray of steam, the aluminous material has been already preheated to a temperature higher than 40°C and consequently boehmite is formed homogeneously and favorably. That is, it has been known that boehmite is formed at a temperature higher than 75°C and therefore it is preferred that the aluminous material has been preheated before the spray of steam or the immersing step in boiling water and the above described treatment in warm water is effective.

Then the aluminous material provided with the boehmite layer is immersed in a heated water soluble thermosetting resin paint. This immersing treatment not only effects painting but also makes the formed boehmite more stable.

For this purpose, the above described paint is maintained at a heated condition and this temperature is usually about 40°–60°C. The maintenance of the heated condition has the following significance. Namely, a thick painted film can be easily formed on the aluminous material, because the aluminous material sprayed with steam is immediately immersed in the paint bath and then taken out from the bath and consequently, the solvent in the paint deposited on the aluminous material is evaporated in a short time owing to the preheating of the aluminous material by the steam spray and the desired amount of paint is maintained on the aluminous material and the desired thickness of painted film is obtained and the cohesion of the painted film is improved.

As a water soluble thermosetting resin paint, mention may be made of acryl, alkyd and phenol alkyd series paints. When the water soluble resin paint contains an organic amine, the boehmite layer is stabilized and the formation thereof is promoted. Such organic amines are, for example, dimethylethanolamine, triethylamine and the like.

Then the thus treated aluminous material is subjected to a heat treatment to not only bake and cure the paint but also promote the growth of the boehmite base layer.

The treatment for promoting the boehmite base layer serves to provide a difficultly soluble boehmite layer other than the above described easily soluble boehmite layer.

Namely, it has been known that in the boehmite layer there are generally an easily soluble layer and a difficultly soluble layer and the boehmite layer formed by a conventional method is limited to the easily soluble layer and therefore such a layer has a problem as the base layer for painting as mentioned above.

In the above described process, the whole boehmite layer formed until the immersing painting is easily soluble but when the coated film maintaining a wet state is heated, the oxidation rate of the above described easily soluble boehmite is improved in a very short time and a difficultly soluble boehmite layer is provided. In these two boehmite layers, the difficultly soluble boehmite layer positions in the vicinity of the surface of the aluminous material and the easily soluble boehmite layer positions thereon. In this case, the heating temperature is 150°–210°C and the treating time is about 15–30 minutes. This treating condition also is effective for cohesion and curing of the painted film.

As mentioned above, the above described process has the following advantages.

1. The formation of a base layer for painting and the formation of a painted film are effected in a continuous step and the base layer is provided with a difficultly soluble boehmite layer. Therefore, this process is economically excellent and a painted film having a high cohesion and strength can be obtained.

2. In this process, since all the steps are effected under heating or under a mildly warmed condition, the boehmite and the painted film are formed rapidly and strongly and the cohesion of the painted film is high.

3. Since a bayerite layer is firstly formed and then converted into a boehmite layer, the formation of the boehmite layer is rapid and easy.

4. The painting is carried out in a heated condition, so that a painted film having a sufficient thickness can be obtained. Therefore, the painted film has an excellent durability.

5. Since the aluminous material has been preheated in the step for forming the boehmite layer, the time for immersing the aluminous material in the paint can be shortened, and moreover the temperature of the paint bath is not lowered.

In order to further improve the above described invention, the inventors have contemplated a combination of the pretreatment of degrease-washing with water-etching, with a formation of a base layer for painting and attempted various improvements for shortening the base layer forming step and for increasing the cohesion with a painted film.

The present invention also seeks to form a base layer, suitable for painting and having excellent properties, on an aluminous material and to obtain a strong composite coated film in which a painted film is bonded strongly to the base layer.

For direct painting of an aluminous material, it has been already proposed that a boehmite layer be formed on the aluminous material and then a painting be made thereon.

In addition, it has been already proposed that the surface of an aluminous material be roughened by a physical or chemical means and then a boehmite film formed thereon.

However, in this process the step of roughening the surface and the step for forming boehmite must be effected separately and the step is complicated. A chemically roughening treatment involves a chemical etching by means of sodium hydroxide, etc. but in this case the roughness of the surface is insufficient and further there is a problem of pollution by discharge of the treated solution.

If the means for roughening the surface is a physical means, fine particles used in the roughening treatment become stuck on the surface of the aluminous material and therefore the stuck particles must be removed by a washing treatment and thereafter the treatment for forming a boehmite layer is carried out. On the other hand, when the treatment for roughening the surface in a chemical process, the chemical treating agent must be removed by washing prior to the formation of the boehmite layer. The inventors have diligently tried to develop a process which solves the drawbacks of conventional processes, simplifies the operation, provides a satisfactory surface roughness and has no public nuisance and in this regard have accomplished the present invention.

Namely, it has been found that it is possible to roughen the surface of an aluminous material and simultaneously form a boehmite layer on the aluminous material by spraying water or an aqueous solution of an organic amine under a pressure of 1–20 Kg/cm$^2$ at a temperature higher than 75°C containing fine particles having a hardness higher than that of the aluminous material, the grain size of said particles being 50–300 $\mu$, for example glass bead particles, on the degreased and washed aluminous material. However, only by this means, the fine particles stick to the surface of the aluminous material and further the boehmite layer is not sufficiently formed.

It has been found that by immersing the thus treated aluminous material in an aqueous solution at a temperature higher than 75°C, containing an organic amine or spraying water or an aqueous solution of an organic amine at a temperature higher than 75°C, the fine particles stuck on the aluminous material are removed and at the same time the formation of the boehmite layer is promoted to form a stable layer.

The second aspect of the present invention is to provide a method for forming a base layer for painting of an aluminous material in which a surface of the aluminous material is roughened and at the same time a base layer is formed, said base layer having high corrosion resistance and mechanical strength.

That is, an aqueous solution of pH 9–11 containing $10^{-3} - 10^{-5}$ mol of an organic amine is sprayed on degreased and washed aluminous material together with fine particles, such as glass bead particles, glass powder particles, Carborundum particles or Alundum particles. The spray of the fine particles seeks mainly to roughen the surface and at the same time contribute to the formation of the boehmite layer due to the sprayed water and organic amine.

The base layer of the present invention is a boehmite layer, which has high corrosion resistance and mechanical strength and even if the aluminous material is deformed, this boehmite layer is not disengaged nor broken. However, although this boehmite layer has such excellent properties, industrial production thereof requires a long time and it is not always possible to obtain a stable boehmite layer.

The inventors have studied this point and as a result, it has been found that when an aqueous solution of an organic amine containing fine particles is sprayed on an aluminous material, the surface roughening treatment can be favorably effected as mentioned above and at the same time the boehmite layer is formed on the aluminous material in only about 3 minutes and the layer is stabilized by the successive washing with water. This is because the surface of the aluminous material is activated by the fine particles and water acts instantaneously when said surface is activated and further the presence of the organic amine presumably promotes the formation of boehmite. The aqueous solution of an organic amine containing fine particles is preferred to be sprayed at a temperature higher than 75°C.

The organic amines are, for example, monoethanolamine, triethylamine, dimethylethanolamine, diethylethanolamine, morpholine, butylamine and the like.

As mentioned above, a base layer is formed on an aluminous material by the spray treatment and then the resulting base layer is immersed in an aqueous solution of an organic amine. This immersing treatment removes fine particles stuck on the aluminous material and at the same time the formed base layer is more stabilized. The temperature of the aqueous solution of organic amine is higher than 75°C and the immersing time is about 3 minutes.

Instead of the above described immersing step, the same object can be attained by spraying steam. The spraying step of steam mainly serves to stabilize the already formed base layer and as a subordinate action the fine particles on the surface of the aluminous material are removed. Accordingly, if the steam contain the above described amine, the more favorable result can be attained and the treating time is usually more than 3 minutes.

Furthermore, a more favorable result can be attained by spraying an aqueous solution containing the organic amine together with a surfactant in the fine particle spraying step.

In this case, the surfactant mainly serves to degrease and when a surfactant is used in the spraying step, it is not necessary to effect a degreasing and washing step as an independent process.

By combining the above described processes, an undegreased aluminous material is sprayed with water containing a surfactant and fine particles and having a temperature higher than 75°C and at the same time, or after a small time interval, steam is sprayed and then the aluminous material is immersed in an aqueous solution of the organic amine at a temperature higher than 75°C to effect the degreasing, washing, surface roughening, formation of the base layer and washing steps in a short time.

As mentioned above, according to the process of the present invention, the boehmite layer as the base layer for painting can be formed on an aluminous material economically in a simplified operation and in a short time, and by the successive painting and baking treatment, the stable base layer can be simultaneously formed.

As seen from the above explanation, the process as described above has the following advantage.

1. The steps for degreasing, roughening the surface, forming the base layer and washing can be effected at the same time or successively and therefore the treatment steps prior to painting can be simplified and this process is very economical.

2. The base layer is a boehmite layer and particularly, the boehmite base layer can be formed in a very short time and the base layer is very stable.

3. There is no problem in handling of the waste solution after the treatment and substantially no chemical agents are used and also in this respect, this process is very economical.

By the above mentioned process, two-thirds of the object of the present invention can be attained. However, colorless clear base layers for painting have been demanded. Namely, unless a base layer for painting which can provide a clear painted film utilizing the metal luster of aluminous material by applying a clear paint is obtained, the object of the present invention cannot be fully accomplished.

As one process for forming boehmite layer, it has been proposed that an aluminous material be immersed in an aqueous solution while maintaining a pH of 4–11 by adding at least one HCl, $H_2SO_4$, $HNO_3$, $Na_2SO_4$, NaOH and NaCl, at 98°C for at least 4 hours. However, this known process for forming boehmite aims at the formation of a boehmite layer suitable for anticorrosion and therefore it is necessary to treat an aluminous material with an aqueous solution of a weak acid or a weak alkali at a high temperature for a long time and it is difficult to obtain a colorless clear boehmite layer.

In the conventional process, the behavior of both cation and anion in acidic or alkaline solution is not clarified and therefore a colorless clear boehmite layer cannot be obtained. Prevention of coloration reaction due to impurities in the aluminous material or in the treating aqueous solution is not clarified and the aging of the treating aqueous solution is rapid and the bath control is complicated.

For the above described reason, in the prior art it is very difficult to obtain commercially a stable colorless clear boehmite layer rapidly.

The third aspect of the present invention is to provide a method for forming a colorless clear boehmite base layer for painting of an aluminous material, which is excellent in cohesion and strength.

Boehmite is a hydrate of aluminum oxide and when impurities, such as silicon, nickel or iron, are contained in an aluminous material in the course of production, these impurities act together with impurities admixed in an aqueous solution to cause a coloration reaction (usually amber color) and particularly silicon among the above described impurities causes an acceleration oxidation as $SiO_2$ in an aqueous solution and considerably influences the coloration reaction and it is very difficult to obtain a colorless clear boehmite. This drawback hinders the clear painting of aluminous materials and limits the utilization of the boehmite layer as a base layer for painting. As a requirement for the production of boehmite, the presence of water and the production temperature of higher than 75°C are necessary. However, in order to form the sufficiently stabilized boehmite layer on an aluminous material as a base layer for painting, a long time is necessary and further it is difficult to obtain a high corrosion resistance.

Another object of the present invention is to provide a method for commercially forming a colorless clear boehmite base layer having a high corrosion resistance.

An aluminous material subjected to a pretreatment, for example degreasing-washing with water-etching-washing with water-neutralization-washing with water, is immersed in water or an aqueous solution of the above described organic amine and 0.5–20 V of direct or alternate current is applied thereto to form boehmite. In this case, the treating time is about 3 minutes and the aluminous material may be the anode or cathode.

For the production of boehmite, the temperature of the aqueous solution is preferred to be higher than 75°C and by applying more than 0.5 V of current a colorless clear boehmite layer can be obtained. This is presumably because the impurities in the aluminous material and the impurities in the aqueous solution are adsorbed at the other pole upon passing an electric current.

Even if an electric current is not passed through water or the aqueous solution, when a metal which is more electrically noble than the aluminous material, such as stainless steel, nickel or lead is used as an opposite pole to the aluminous material, the same object can be attained.

In this case, one of the poles is the aluminous material and the other pole is a metal which is more noble than the aluminous material and therefore one of poles of aluminous material is charged (−) and the other pole is charged (+). Accordingly, the impurities present in the aqueous solution are adsorbed by said other pole and even if the aluminous material contains impurities, the impurities do not color the boehmite layer.

Instead of using the aluminous material and the more noble metal as opposite poles, if the vessel for containing the aqueous solution is constituted of a metal more noble than the aluminous material, the same effect can be obtained.

In order to form a more stabilized colorless clear boehmite layer rapidly, a degreased and washed aluminous material is immersed in a basic aqueous solution of pH 9.5–11 at 40°–75°C for more than 2 minutes and then the aluminous material is immersed in water or the above described aqueous solution, where the metal more noble than the aluminous material is introduced as an opposite pole, having a temperature higher than 75°C and pH of 9.5–11 for more than 3 minutes.

The step wherein the aluminous material is treated in an aqueous solution of pH of 9.5–11 at 40°–70°C for more than 2 minutes, is a pretreatment for the forming of the boehmite layer on the aluminous material and it serves to form a bayerite layer and to preheat the aluminous material. At a pH of less than 9.5, the formation of bayerite is difficult in treatment of about 2 minutes and at a pH of more than 11, the formed bayerite may be dissolved off again.

The maintenance of the above described pH in the aqueous solution can be attained by the addition of organic amines and other alkaline substances, for example 2-dimethylaminoethanol, morpholine, sodium carbonate, sodium hydroxide, barium hydroxide and the like.

As mentioned above, the aluminous material is subjected to the pre-treatment and thereafter the aluminous material is immersed in an aqueous solution at at temperature higher than 75°C at the above described pH for more than 3 minutes. This treatment is effected for converting the primarily formed bayerite to boehmite and from this point of view the temperature must be higher than 75°C.

In the above description, the second stage of treatment for forming boehmite is shown by an embodiment wherein said treatment is effected in a basic aqueous solution of pH of 9.5–11 but if the temperature is higher than 75°C, the boehmite is formed even in a mere aqueous solution.

Alternatively, as the treating aqueous solution of the second stage, an aqueous solution of nitric acid of pH of 2.5–3.5 may be used.

A pH of less than 2.5 in the aqueous solution of nitric acid, the boehmite layer is dissolved off and the formation of the layer is impossible and at a pH of more than 3.5, ionization of impurities in the aluminous material lowers and the dissociation is not promoted and the influence for forming the colorless boehmite is reduced. The selection of nitric acid is based on the following reason. The acidic solution serves to stabilize the boehmite layer and further the activity of nitric acid for dissociating impurities is higher than that of sulfuric acid, hydrochloric acid and the like and accordingly, nitric acid is most suitable for forming the boehmite layer and making the layer colorless and clear.

As seen from the above, this process has the following effects.

1. The colorless clear boehmite layer is obtained as a base layer for painting.

2. Said colorless clear boehmite layer can be obtained rapidly and the resulting layer has a satisfactory property as a base layer for painting even if the treating time is short.

Following the treatment for forming the base layer, a clear paint is applied on the thus treated aluminous material and then it is baked and cured to form a painted film having a luster inherent to aluminous material, which has excellent cohesion and corrosion resistance.

The step for forming the base layer is a primary step for forming a finally completed base layer in the painting step and further a preheating step for promoting the heated painting treatment.

The following examples are given for the purpose of illustration of this invention and are not intended as limitations thereof. In the examples, "%" and "part" mean by weight unless other specified.

EXAMPLE 1

Aluminum-based alloy AA 6063 was immersed in an 8.0% NaOH aqueous solution at 60°C for 3 minutes to degrease the alloy and then it was washed with water. Then, the aluminum alloy was immersed in a 10% $HNO_3$ aqueous solution at room temperature for 20 seconds to neutralize the NaOH remaining on the surface of the alloy and it was thereafter washed with water.

The above degreased and washed aluminum-based alloy was immersed in a warm aqueous solution containing 500 ppm of dimethylethanolamine at 50°C for 5 minutes. As the result of this treatment, an amber-colored bayerite layer was formed on the alloy. Then, the alloy was sprayed with steam for about 10 minutes under atmospheric pressure. Examination of the layer formed on the alloy was made by means of electron diffraction, and it was found that a boehmite layer was formed. When a solubility test of this boehmite layer was effected by using an aqueous solution containing $CrO_3$ and phosphoric acid, the layer was wholly dissolved within 20 minutes, and was easily soluble. Then, the alloy was immersed in a transparent water-soluble thermosetting resin paint heated at 45°C and having the composition as shown in the following Table 1 for 2 minutes, whereafter it was taken out from the paint and subjected to setting. When the resulting painted film was peeled off, and the boehmite layer on the aluminum-based alloy was examined, it was found that the boehmite layer was a transparent and stable layer.

The above treated alloy was finally heated at 180°C for 20 minutes, whereby a painted film having a high cohesion was formed. From the examination of the solubility of the base layer by means of the above described test solution, it was confirmed that a difficultly soluble boehmite layer was formed, which did not dissolve even when the layer was immersed in the test solution for more than 20 minutes. Further, it was confirmed that such a difficultly soluble boehmite layer was formed on all aluminum-based alloys.

Table 1

| Ingredient | Recipe (part) |
|---|---|
| Acrylic resin | 24.0 |
| Melamine resin | 6.0 |
| Diemethylethanolamine | 5.6 |
| Ethylene glycol monobutyl ether | 18.5 |
| Ethylene glycol monoethyl ether | 10.0 |
| Water | 35.9 |
| Total | 100.0 |

EXAMPLE 2

The same aluminum-based alloy as used in Example 1 was degreased and washed with water in a conventional manner as described in Example 1. Then the alloy was immersed in warm water at 50°C for 5 minutes, and further immersed in boiling water containing 0.1% of dimethylethanolamine or 5 minutes, and subjected to painting and heating treatments in the same manner as described in Example 1.

The resulting painted film had substantially the same quality as the painted film of Example 1, and had an amber color due to the dimethylethanolamine added to the boiling water.

EXAMPLE 3

Aluminum-based alloy AA 1100 was degreased and washed with water in a conventional manner. Then, the alloy was sprayed with an aqueous dispersion containing 0.3% of triethanolamine and glass bead particles having a size of 149 to 210 $\mu$ at 80°C under a spraying pressure of 3 Kg/cm$^2$, and then it was immersed in hot water containing 0.3% of triethanolamine at 90°C for 15 minutes. By such a treatment, a properly roughened surface was formed on the aluminum-based alloy and at the same time a boehmite layer suitable as a base layer for painting was formed on the rough surface.

Then, the alloy was immersed in a water-soluble thermosetting resin paint heated to 60°C and having the composition as shown in the following Table 2 for one minute, then it was taken out from the paint, subjected to setting, and heat-treated at 180°C for 15 minutes, whereby a painted film having a high cohesion was formed on the aluminum-based alloy.

Table 2

| Ingredient | Recipe (part) |
|---|---|
| Acrylic resin | 27.4 |
| Melamine resin | 4.0 |
| Monoethanolamine | 8.0 |
| Ethylene glycol monobutyl ether | 11.0 |
| Ethylene glycol monoethyl ether | 17.0 |
| Surfactant | 2.6 |
| Water | 30.0 |
| Total | 100.0 |

EXAMPLE 4

The same aluminum-based alloy as used in Example 3 was degreased and washed in a conventional manner. Then, the alloy was sprayed with superheated steam containing glass bead particles having a size of 149 to 210 $\mu$ and kept at a pressure of 7 Kg/cm$^2$, and thereafter sprayed with superheated steam at a pressure of 5 Kg/cm$^2$ for about 10 minutes. By such a treatment, a properly roughened surface was formed on the aluminum-based alloy and a boehmite layer suitable as a base layer for painting was formed on the rough surface similarly to Example 3. Then, the alloy was subjected to painting and heating treatments in the same manner as described in Example 3, whereby a painted film similar to that of Example 3 was formed on the aluminum-based alloy.

EXAMPLE 5

Aluminum-based alloy AA 6063 was sprayed with an aqueous dispersion containing glass bead particles having a size of 149 to 210 $\mu$, 0.3% of triethanolamine and a surfactant (Nonion type, Sunclear, Trademark, Made by Nikka Chemical Industrial Co., Ltd., pH: about 11.5) for about 3 minutes at a temperature of 75°C and under a spraying pressure of 5 Kg/cm$^2$, and then it was immersed in an aqueous solution containing 0.3% of triethanolamine for 15 minutes. By such a treatment, a properly roughened surface was formed on the aluminum-based alloy and a boehmite layer, suitable as a base layer for painting, was formed on the rough surface similarly to Example 3. Then, the alloy was immersed in a water-soluble thermosetting resin paint heated to 50°C and having the composition as shown in the following Table 3 for 2 minutes, taken out from the paint, subjected to setting, and heat-treated at 200°C for 20 minutes, whereby a white painted film having a high cohesion was formed on the aluminum-based alloy.

Table 3

| Ingredient | Recipe (part) |
|---|---|
| Titanium oxide | 25.0 |
| Acrylic resin | 10.0 |
| Melamine resin | 3.0 |
| Triethylamine | 8.0 |
| Ethylene glycol monobutyl ether | 10.0 |
| Ethylene glycol monoethyl ether | 17.0 |
| Surfactant | 2.0 |
| Water | 25.0 |
| Total | 100.0 |

EXAMPLE 6

The same aluminum-based alloy as used in Example 3 was degreased and washed with water in a conventional manner. Then, the alloy was sprayed with steam containing 0.3% of triethanolamine and glass bead particles having a size of 149 to 210 $\mu$ under a spraying pressure of 7 Kg/cm², and it was then sprayed with steam containing 0.3% of triethanolamine for 4 minutes under a spraying pressure of 5 Kg/cm². By such a treatment, a properly roughened surface was formed on the alloy and a boehmite layer suitable as a base layer for painting was formed on the rough surface similarly to Example 3. Then, the alloy was subjected to painting and heating treatments in the same manner as described in Example 5, whereby a painted film similar to that of Example 5 was formed on the aluminum-based alloy.

EXAMPLE 7

The same aluminum-based alloy as used in Example 3 was sprayed with an aqueous dispersion containing a surfactant as described in Example 5 and glass bead particles having a size of 149 to 210 $\mu$ and at 80°C under a spraying pressure of 3 Kg/cm², and after the spraying of the aqueous dispersion, steam was sprayed onto the alloy. Then, the alloy was immersed in water containing 0.3% of triethanolamine and at 90°C for 15 minutes. By such a treatment, a properly roughened surface was formed on the alloy and a boehmite layer suitable as a base layer for painting was formed on the rough surface similarly to Example 3. Then, the alloy was subjected to painting and heating treatments in the same manner as described in Example 1, whereby a painted film having a high cohesion was formed on the aluminum-based alloy.

EXAMPLE 8

The same aluminum-based alloy as used in Example 1 was degreased and washed with water in a conventional manner. Then, the alloy was immersed in boiling water (100°C), and supplied with a direct current of 10 V for 4 minutes, whereby a transparent colorless boehmite layer was formed on the alloy. Then, the alloy was immersed in a transparent water-soluble thermosetting resin paint at 47°C and having the composition as shown in the following Table 4 for 50 seconds, taken out from the paint, subjected to setting, and heat-treated at 210°C for 20 minutes, whereby a highly transparent painted film was formed on the aluminum-based alloy.

When an electric voltage was applied to the alloy in the formation of the above described boehmite layer, a somewhat improved result was obtained in the case when the alloy was used as the cathode as compared with the case when the alloy was used as the anode. However, there is no significant difference between the two cases.

Table 4

| Ingredient | Recipe (part) |
| --- | --- |
| Acrylic resin | 30.0 |
| Melamine resin | 9.0 |
| Dimethylethanolamine | 4.0 |
| Ethylene glycol monobutyl ether | 19.0 |
| Ethylene glycol monoethyl ether | 15.0 |
| Water | 23.0 |
| Total | 100.0 |

EXAMPLE 9

The same aluminum-based alloy as used in Example 3 was degreased and washed with water in conventional manner. Then, the alloy was immersed in boiling water (100°C), supplied with an alternating current of 0.5 V for 6 minutes, and taken out from the boiling water. By such a treatment, a transparent colorless boehmite layer was formed on the alloy similarly to Example 8. Then, the alloy was subjected to painting and heating treatments in the same manner as described in Example 8, whereby a highly transparent painted film, similar to that of Example 8, was formed on the aluminum-based alloy.

EXAMPLE 10

The same aluminum-based alloy as used in Example 1 was degreased and washed with water in a conventional manner. Then, the alloy was immersed in boiling water (about 100°C) for 4 minutes together with a stainless steel plate (SUS 27) as an opposite pole the alloy. By such a treatment, a transparent colorless boehmite layer was formed on the alloy. Then, the alloy was subjected to painting and heating treatments in the same manner as described in Example 8, whereby a highly transparent painted film similar to that of Example 8 was formed on the aluminum-based alloy.

EXAMPLE 11

Two plates of aluminum-based alloys, the same as used in Example 3, were degreased and washed with water in a conventional manner. Then, these alloys were immersed in boiling water in a vessel made of stainless steel plate (SUS 27) for 4 minutes to form a transparent colorless boehmite layer on each of the aluminum-based alloys.

Then, the alloy was subjected to painting and heating treatments in the same manner as described in Example 8, whereby a highly transparent painted film similar to that of Example 8 was formed on the aluminum-based alloy.

EXAMPLE 12

The same aluminum-based alloy as used in Example 1 was degreased and washed with water in a conventional manner.

Then, the alloy was immersed in a warmed aqueous solution containing $1 \times 10^{-2}$ mol of 2-dimethylaminoethanol or morpholine at 60°C for 4 minutes, after which the temperature of the solution was raised to 75°C, and then a stainless steel plate was immersed therein for 5 minutes as an opposite pole to the alloy, and then he alloy was taken out from the solution. By such a treatment, a transparent colorless boehmite layer was formed on the aluminum-based alloy. Then, the alloy was subjected to painting and heating treatments in the same manner as described in Example 1, whereby a highly transparent painted film was formed on the aluminum-based alloy.

EXAMPLE 13

The same aluminum-based alloy as used in Example 3 was degreased and washed with water in a conventional manner. Then, the alloy was immersed in a warmed aqueous solution containing $1 \times 10^{-3}$ mol of sodium carbonate or barium hydroxide or $5 \times 10^{-4}$ mol of sodium hydroxide at 60°C for 5 minutes, and then the alloy and a steel plate were immersed in boiling water for 7 minutes as opposite poles, and taken out from the water. By such a treatment, a transparent colorless boehmite layer was formed on the aluminum-based alloy. Then, the alloy was subjected to painting and heating treatments in the same manner as described in Example 1, whereby a highly transparent painted film was formed on the aluminum-based alloy.

EXAMPLE 14

The same aluminum-based alloy as used in Example 1 was degreased and washed with water in a conventional manner. Then, the alloy was immersed in warm water at 50°C for 5 minutes to form a bayerite layer on the alloy, after which the alloy was immersed for 8 minutes in an aqueous solution of nitric acid at 95°C and having a pH of 3.1, which was contained in a stainless steel vessel, and then the alloy was taken out from the vessel. By such a treatment, a transparent colorless boehmite layer was formed on the aluminum-based alloy. Then, the alloy was subjected to painting and heating treatments in the same manner as described in Example 1, whereby a highly transparent painted film was formed on the aluminum-based alloy.

As described above, since the process of the present invention is very simple, control of the operation is easy and a painted film having an improved quality can be easily obtained. Moreover, the cohesion between the base layer and the painted film is remarkably high, and additionally the painted film itself has excellent physical properties. Therefore, the present invention is superior to conventional methods.

EXAMPLE 16

Comparison of composite coated films, which were composed of a base layer formed on aluminum-based alloy AA 6063 by anodic oxidation and a clear synthetic paint painted thereon, with the composite coated film obtained in Example 14 of the present invention was made under the conditions described in the following Tables 5 and 6 in order to show the improved quality of the composite coated film of the present invention, and the quality of the tested samples was estimated and marked according to the standard described in the following Table 7. Table 5 shows the paints used and the treating conditions in the coating. Table 6 shows the conditions for testing the quality of the composite coated films. Table 7 shows the standard for estimating the quality of the coated film and mark corresponding to the standard value.

Table 5

| Sample | Treating condition | | | | Paint |
|---|---|---|---|---|---|
| | Base layer | | Painting | Baking | |
| A | Anodic oxidation | | air spray ($7\mu$) | 100°C, 30 min. | acrylic resin for low temperature baking |
| B | 15% $H_2SO_4$ current density | 130 A/m² | air spray ($7\mu$) | 120°C, 35 min. | polyurethane modified with acrylic compound |
| C | electrolysis time | 27 min. ($9\mu$) | electrostatic process ($7\mu$) | 160°C, 20 min. | thermosetting acrylic resin |
| D | sealing | higher than 98°C, 30 min. | electrophoresis ($7\mu$) | 180°C, 30 min. | water-soluble acrylic resin for electro-deposition |
| E | Present invention (painting:immersion) boehmite layer + painted film = $7\mu$ | | | 190±10°C, 30 min. | |

EXAMPLE 15

The same aluminum-based alloy as used in Example 3 was degreased and washed with water in a conventional manner. Then, the alloy was immersed in warm water at 60°C and containing 500 ppm of dimethylethanolamine for 3 minutes to form a bayerite layer on the alloy, after which the alloy was immersed in an aqueous solution of nitric acid having a pH of 2.7 and at 98°C for 8 minutes together with a stainless steel plate as an opposite pole to the alloy, and then the alloy was taken out from the solution. By such a treatment, a transparent colorless boehmite layer was formed on the aluminum-based alloy. Then, the alloy was subjected to painting and heating treatments in the same manner as described in Example 1, whereby a highly transparent painted film was formed on the aluminum-based alloy.

Table 6

| Test | Condition |
|---|---|
| Chemical resistance test (1) | 1% NaOH test (spot test by a glass ring having a diameter of 30 mm at room temperature) |
| Chemical resistance test (2) | 5% NaOH test (spot test by a glass ring having a diameter of 30 mm at room temperature) |
| Sulfurous acid aqueous solution test | 1% solution; 25 hours; immersed at room temperature |
| Sunshine-weather test | set temperature: 40°C<br>arc filter: none<br>average humidity: 50%<br>time: 500 hours |
| Dew cycle test | light on: 1 hour<br>darkness: 1 hour<br>time: 200 hours |

Table 7

| Chemical resistance test (1) | Chemical resistance test (2) | Sulfurous acid aqueous solution test | Sunshine-weather test | Dew cycle test | Mark |
|---|---|---|---|---|---|
| time until corrosion appears (hr.) | time until corrosion appears (hr.) | rate of corrosion developed (R.N.) | percentage of gloss maintained (%) | percentage of gloss maintained (%) | |
| 0 – 5 | 0 – 5 | 0 | less than 75 | 0 – 10 | 0 |
| 5 – 10 | 5 – 10 | 1 – 2 | 75 – 80 | 10 – 20 | 2 |
| 10 – 20 | 10 – 20 | 3 – 4 | 80 – 85 | 20 – 30 | 4 |
| 20 – 48 | 20 – 48 | 5 – 6 | 85 – 90 | 30 – 40 | 6 |
| 48 – 72 | 48 – 72 | 7 – 8 | 90 – 95 | 40 – 50 | 8 |
| more than 72 | more than 72 | 9 – 10 | 95 – 100 | more than 50 | 10 |

Marks given to the above tested samples are shown in the following Table 8. As seen from Table 8, the composite coated film of the present invention has the highest mark, which shows that the film has an improved quality.

Table 8

| Sample | Paint | Film thickness ($\mu$) base layer | Film thickness ($\mu$) painted film | Chemical resistance test (1) | Chemical resistance test (2) | Sulfurous acid aqueous solution test | Sunshine-weather test | Dew cycle test | Total of marks | Rank |
|---|---|---|---|---|---|---|---|---|---|---|
| A | Acrylic resin for low temperature baking | 9 | 7 | 6 | 0 | 8 | 4 | 4 | 22 | 5 |
| B | Polyurethane modified with acrylic compound | 9 | 7 | 6 | 2 | 8 | 2 | 6 | 24 | 4 |
| C | Thermosetting acrylic resin | 9 | 7 | 10 | 10 | 6 | 4 | 4 | 34 | 3 |
| D | Water-soluble acrylic resin (for electro-deposition) | 9 | 7 | 10 | 8 | 10 | 6 | 2 | 36 | 2 |
| E | G–2636 | | 7 | 10 | 10 | 10 | 6 | 6 | 42 | 1 |

What is claimed is:

1. A method for painting an aluminous material comprising
   1. contacting the aluminous material with water at a temperature of 40°–75°C to form a bayerite layer on the aluminous material and then contacting the material at a temperature higher than 75°C in the presence of water to convert the bayerite layer to a boehmite layer,
   2. immersing the aluminous material provided with the boehmite layer in a water-soluble thermosetting resin paint bath containing an organic amine having a temperature of 40°–60°C and thereafter removing the aluminous material from the paint bath and
   3. heating the now painted aluminous material to a temperature of 150°–210°C for a time sufficient to bake and cure the paint and simultaneously to complete the formation of the boehmite layer.

2. A method as claimed in claim 1 wherein the aluminous material is contacted with water to form the bayerite layer by immersing a degreased and washed aluminous material in water or an aqueous solution of an organic amine, whereafter to form the boehmite layer, the thus treated aluminous material is immersed in boiling water.

3. A method as claimed in claim 1 wherein the aluminous material is contacted with water to form the bayerite layer by immersing a degreased and washed aluminous material in water or an aqueous solution of an organic amine, whereafter to form the boehmite layer, the thus treated aluminous material is sprayed with steam.

4. A method for painting an aluminous material comprising
   1. spraying at pH 9–11 and at a temperature higher than 75°C, material selected from the group consisting of water, an aqueous solution containing an organic amine or steam, each of which contains fine particles of 50–300 $\mu$ having a hardness higher than that of the aluminous material, under a pressure of 1–20 kg/cm² onto the aluminous material to roughen the surface of the aluminous material and simultaneously to form a boehmite layer thereon, contacting the thus treated aluminous material with water at a temperature higher than 75°C to remove fine particles adhered to the aluminous material and to grow the boehmite layer, 2. immersing the aluminous material provided with the boehmite layer in a water-soluble thermosetting resin paint bath containing an organic amine having a temperature of 40°–60°C and thereafter removing the aluminous material from the paint bath and 3. heating the now painted aluminous material to a temperature of 150°–210°C for a time sufficient to bake and cure the paint and simultaneously to complete the formation of the boehmite layer.

5. A method as claimed in claim 4 wherein to remove the fine particles the aluminous material is sprayed with steam.

6. A method as claimed in claim 4 wherein to remove the fine particles the aluminous material is immersed in an aqueous solution containing an organic amine.

7. A method as claimed in claim 4 wherein the aluminous material is initially degreased and washed.

8. A method as claimed in claim 4 wherein the substance in said initial spray step contains a surfactant whereby to simultaneously degrease the material while the material is roughened and the boehmite layer is formed.

9. A method as claimed in claim 8 comprising spraying the treated aluminous material, before immersion in aqueous amine solution, with steam.

* * * * *